(12) United States Patent
Gogel

(10) Patent No.: US 11,785,001 B1
(45) Date of Patent: Oct. 10, 2023

(54) IMAGE-BASED ACCESS TO DATA

(71) Applicant: Amazon Technologies, Inc., Seattle, WA (US)

(72) Inventor: Edward Dean Gogel, St. Helena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 17/027,420

(22) Filed: Sep. 21, 2020

(51) Int. Cl.
*H04L 9/40* (2022.01)
*G06K 7/14* (2006.01)
*G06K 7/10* (2006.01)

(52) U.S. Cl.
CPC ...... *H04L 63/0853* (2013.01); *G06K 7/10722* (2013.01); *G06K 7/1417* (2013.01)

(58) Field of Classification Search
CPC .......................... G06K 7/1417; H04L 63/0853
USPC ............................................................ 726/4
See application file for complete search history.

(56) References Cited

U.S. PATENT DOCUMENTS

| | | |
|---|---|---|
| 8,526,922 B1 | 9/2013 | Koster |
| 2011/0202471 A1 | 8/2011 | Scott et al. |
| 2015/0154624 A1 | 6/2015 | Torabi |
| 2015/0161643 A1 | 6/2015 | Randell et al. |
| 2016/0019746 A1* | 1/2016 | Lyons ............... G06Q 20/3224 463/31 |
| 2016/0300237 A1 | 10/2016 | Khan |
| 2016/0359987 A1 | 12/2016 | Laliberte |
| 2018/0343477 A1 | 11/2018 | Loheide et al. |
| 2019/0325498 A1 | 10/2019 | Clark |
| 2019/0370438 A1* | 12/2019 | Char ................... G06Q 20/306 |
| 2020/0202414 A1 | 6/2020 | Odom et al. |
| 2020/0402099 A1 | 12/2020 | Pittman |
| 2021/0042724 A1 | 2/2021 | Rathod |
| 2021/0075530 A1 | 3/2021 | Modi |
| 2022/0292545 A1 | 9/2022 | Yoo et al. |

* cited by examiner

*Primary Examiner* — Toan C Ly
(74) *Attorney, Agent, or Firm* — Davis Wright Tremaine LLP

(57) ABSTRACT

Disclosed techniques provide an image-based process that allows a computing device to obtain content from a content provider. Identification data is obtained from processing image data. Using the obtained identification data and access data, the content is provided to the computing device. The image data and the identification data obtained from processing the image data are linked to the computing device.

22 Claims, 7 Drawing Sheets

IMAGE-BASED ACCESS TO DATA

CROSS-REFERENCE TO RELATED APPLICATION

This application incorporates by reference for all purposes the full disclosure of co-pending U.S. patent application Ser. No. 17/027,428, filed Sep. 21, 2020, entitled "DATA SHARING THROUGH ENHANCED ADVERTISING."

BACKGROUND

Consumers can use computer network systems, such as the Internet, to access a variety of online resources, such as data, applications, and services. Techniques employed to reliably verify the identity of a consumer or other user of a computer network system prior to allowing the user access to system resources is generally referred to as authentication. For example, the user may send a username and password to a remote server in order to authenticate the user for access to the resources provided thereby. Cryptography can be used to preserve the confidentiality of the transmitted username and password.

However, password-based authentication can be somewhat cumbersome to the user. For example, as each online resource typically requires its users to have unique usernames, a user may be unable to use the same username to access multiple online resources if that username is already in use by another user of any of the online resources. As such, a user may be required to remember several different usernames in order to access different online resources, as well as to keep track of which username was used to set up the account for each online resource. Likewise, each online resource may have different rules as to the types of character strings that may be used as passwords. Thus, in addition to remembering different usernames, a user may also be required to remember several different passwords in order to access different online resources, as well as to keep track of which username-password pair applies to each account.

The use of usernames and passwords for authentication may also present problems from a security perspective. For example, password-based authentication may be vulnerable to keystroke logging applications or phishing attacks. Also, should a user's password for an online resource be compromised by the above or other security issues, the user may be required to create and remember yet another password, thereby compounding the above-mentioned problems associated with remembering and keeping track of different usernames and password combinations for different accounts.

BRIEF DESCRIPTION OF THE DRAWINGS

Various techniques will be described with reference to the drawings, in which.

DETAILED DESCRIPTION

Figure 1:
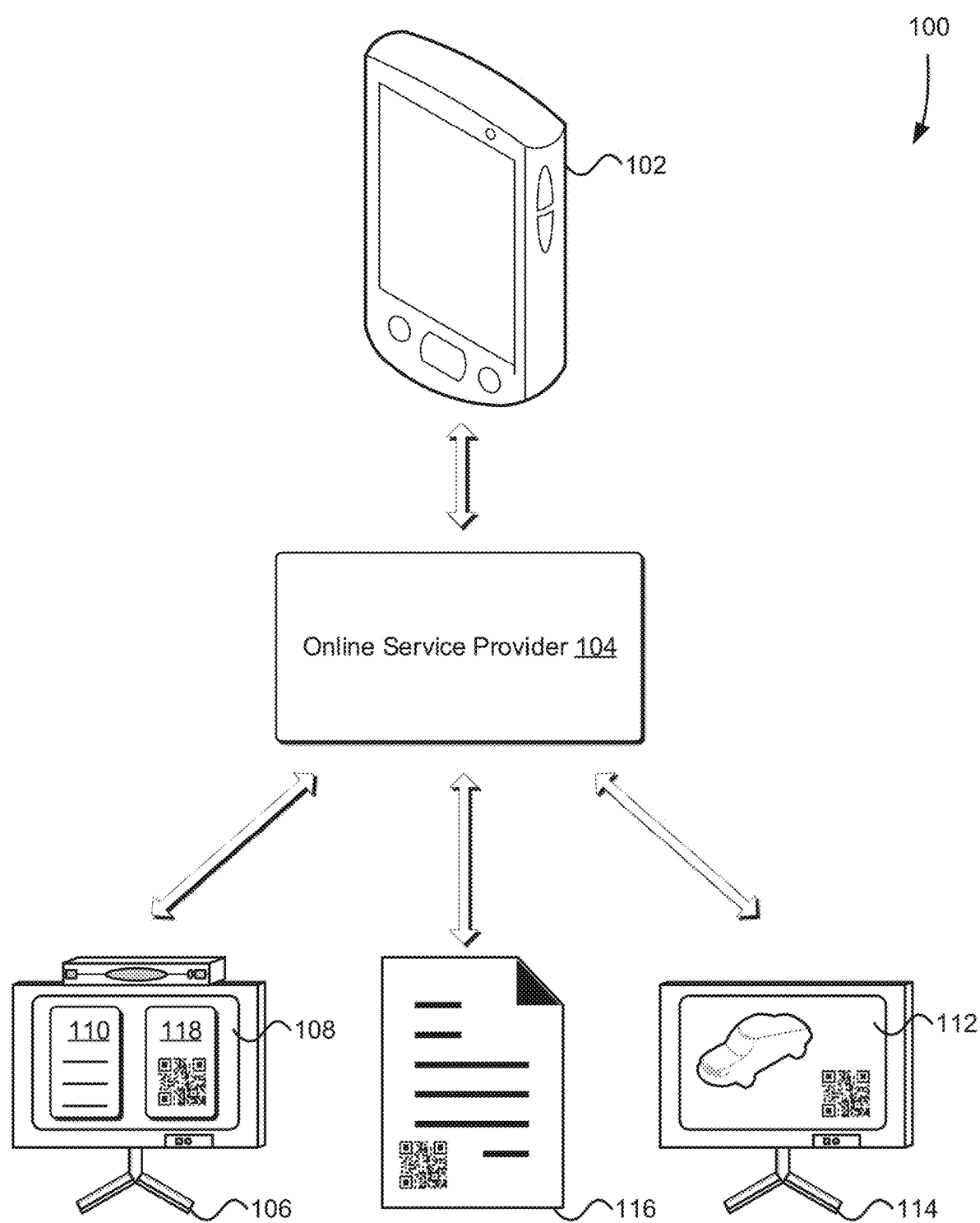
FIG. 1 shows an illustrative example of an environment in which various embodiments of the present disclosure can be practiced.

The present disclosure describes a variety of techniques for gaining or granting access to data without the use of a username and password. Specifically, described methods, systems, and devices can provide alternate ways for gaining access to online resources, instead of entry of a username and password. As used herein, an online resource may refer to any data or content that is accessible via a network, such as web-based or cloud-based data, applications, and services. Examples of online services and resources may include, but are not limited to, web-based or cloud-based data storage services provided by online service providers, social networking applications, shopping services, payment services, multimedia content delivery services, such as online magazine, music, video, audiovisual services, and the like.

In particular, techniques described herein allow customers to gain access to one or more accounts associated with online applications or services without having to enter a username and password, using a computing device, when the online application or services are sought to be accessed by the customers. An image may be displayed on a display of the computing device (or instead of) alongside a password based sign in window that is typically used to access a customer account linked to an online service provider. A computing device with a camera, such as a mobile phone, can scan the image to obtain a code, identifier, or other identification data embedded in the image. For example, image data can be generated from scanning the image. The image data can be processed, using image processing or artificial intelligence (AI) image processing techniques of the computing device, to obtain the code. The computing device can send the code, identifier, or the other identification data embedded in the image to a server computing device linked to the online service provider. In some embodiments, the online service provider provided the image for display on the computing device. The online service provider can use the identification data to confirm that the computing device is eligible, authorized, or approved to receive content from the online service provider.

The computing device that scanned the image to obtain the identification data can also provide access data to the online service provider. The access data can be used by the online service provider to confirm that a user is authorized to access content from the online service provider, such as content hosted on servers of the online service provider for a third party, or content provided by the online service provider through services of the online service provider. The access data can be generated using a process to confirm or validate an identity of a user or customer of the online service provider. The access data can include an access token that can be used by the online service provider to confirm that the user is authorized to access content from the online service provider. The online service provider can provide the access token in response to a user authentication process performed by the user of the computing device that scanned the image. This authentication process may have occurred prior to using the computing device to scan the image to obtain the identification data. The access token can be issued based on an OAuth 1.0, 2.0, or 2.x open protocol authentication process or a similar authentication process. The access data can include credential data of the user. For example, the credential data may include a username and password that are used by the online service provider to confirm that the user is authorized to gain access to content provided by the online service provider. The access data can be generated from a biometric authentication process that relies on unique biological characteristics of the user to verify their identity and access to content provided by the online service provider. The access data can be encrypted using standard encryption techniques such as public key infrastructure (PKI).

The described image-based authentication techniques, methods, and systems allow a user to quickly and simply access their account linked to an online service provider that provides streaming content. For example, a television or other display, such as a display coupled to a set-top box, may be provisioned to display a quick response (QR) code or another a non-alphanumeric encoding. The QR code may be displayed by the television after completion of a process that confirms that the television is authorized or otherwise approved to receive streaming content from the service. The QR code can include embedded, also referred to as encoded, identification data, such as a unique code or other identifier, which is identifiable using a computing device (e.g., a mobile phone). For example, image data can be generated from scanning the QR code. The image data can be processed, using image processing or AI image processing techniques of the computing device, to obtain the QR code.

A user scans the QR code with the mobile phone to quickly gain access to their account linked to the online service provider that provides streaming content. Scanning and processing the QR code reveals the embedded identification data. The identification data can be provided to the online service provider. The online service provider uses the identification data to confirm that the television is authorized to receive streaming content from the online service provider.

The user can also provide, via the mobile phone for example, access data to the online service provider. The access data can be used by the online service provider to confirm that the user has access to some or all of the streaming content provided by the online service provider. The access data can be generated using a process to confirm or validate an identity of the user or customer of the online service provider. The access data can be an access token or key. Alternatively, the access data can be credential data including a username and password that allows the user to gain access to the online service provider. In another example, the access data can be biometric data that can be confirmed by the online service provider to show that the user is authorized to consume streaming content from the online service provider. In some embodiments, the user can provide access data to gain access to the online service provider prior to using the mobile phone to scan the QR code.

The described image-based authentication techniques, methods, and systems allow an individual to share their personal information with an entity, such as a private company, medical provider, or a government agency. The entity may generate a form or document used to collect information from the individual. For example, the entity, such as a medical provider or the Department of Motor Vehicles (DMV), may generate a form that is to be completed by an individual in advance of receiving services from the entity.

The form can include an embedded code detectable by a computing device. For example, the embedded code associated with the form may be detectable by a computing device implementing a camera. The embedded code can be associated with a QR code or another a non-alphanumeric encoding. The embedded code can be integrated with text on the form. For example, using stenography techniques, the embedded code can be hidden from the human eye yet detectable with a computing device once an image of the form and its associated text are captured by a camera. Alternatively, the embedded code is in plaintext format.

The code associated with the form can be obtained by an online service provider. The online service provider can store personal information of the individual that obtained the code using the computing device. The online service provider can provide a service that stores personal information for its customers. The individual can transmit the code associated with the form to the online service provider using their mobile phone.

The online service provider can store copies of documents used to collect information from individuals. The online service provider can store copies of the documents as a service provided to companies or government agencies. Each of the stored documents may have an associated code. Using the code received from the individual, the online service provider can identify the document that was scanned to obtain the embedded code. The online service provider can analyze the identified document to determine the personal information that the entity that provided the document is seeking to obtain from the individual.

Personal information of the individual may have been previously stored by the online service provider. The online service provider can provide the personal information requested by the document to the entity. The online service provider can request that the individual authorize the dissemination of their personal information requested by the document. For example, the individual may be prompted, via their mobile phone, to authorize the dissemination of their personal information.

The described image-based information sharing techniques, methods, and systems allow an individual to share their personal information with an entity, such as a private company, medical provider, or a government agency, associated with an advertisement. The advertisement can be via a print medium, such as newspaper advertisement or direct-mail advertisement, or video medium, such as an online advertisement or television advertisement.

An advertisement can include an embedded code detectable by a computing device. For example, the embedded code associated with the advertisement may be detectable by a computing device, such as a computing device implementing a camera that captures one or more images of the advertisement. The embedded code can be associated with a QR code or another a non-alphanumeric encoding. The embedded code can be integrated with text of the advertisement. For example, using stenography techniques, the embedded code can be hidden from the human eye yet detectable with a computing device once an image of the advertisement and its associated text are captured by a camera. In another example, the embedded code is in plaintext format. Alternatively, the embedded code is in a video frame or several video frames of a video advertisement.

The code associated with the advertisement can be obtained by an online service provider. The online service provider can store personal information of the individual that obtained the code using the computing device. The online service provider can provide a service that stores personal information for its customers. The individual can transmit the code associated with the advertisement to the online service provider using their mobile phone.

Using the code received from the individual, the online service provider can identify the advertisement that was scanned to obtain the embedded code. For example, the online service provider can store codes that are linked to advertisements and the entities, such as companies or government agencies, associated with the advertisements.

Personal information of the individual may have been previously stored by the online service provider. The online service provider can provide the personal information to an entity associated with the advertisement that was scanned to obtain the embedded code. For example, the advertisement may be for an automobile. The online service provider can request that the individual authorize the dissemination of some or all of their personal information stored by the online service provider to a manufacturer of the advertised automobile. For example, the individual may be prompted, via their mobile phone, to authorize the dissemination of their personal information. The online service provider can also facilitate arranging a meeting between the advertiser and the individual, such as through authorized access to respective calendars of the advertiser and the individual. The online service provider can also obtain or use prior authorization, in response to receiving a code linked to an advertisement, to send information pertinent to the advertisement to the individual. In another example, the online service provider can use the obtained authorization to provide one or more samples, salient to the advertisement, to the individual that scanned the advertisement.

In another example, a computing device implementing a camera can capture one or more images of the advertisement. The computing device can transmit image data of the advertisement to the online service provider. The image data can be determined from the one or more images of the advertisement. For example, the computing device can process the one or more images of the advertisement to generate the image data. In some embodiments, generating the image data involves using the camera and its associated image sensor to generate a plurality of pixels. These pixels are processed by the computing device to convert the pixels to numeric form that is stored in a computer storage as image data. The computer storage can be part of the computing device including the camera. Alternatively, the computer storage can be part of a distributed computer storage. For example, the image data can be communicated to the distributed storage by the computing device that obtained the one or more images of the advertisement. The distributed storage can be provided by the online service provider.

The image data can be obtained by the online service provider. The image data can be used by the online service provider to identify an entity affiliated with the advertisement. For example, the online service provider can process the image data to identify the advertisement observed using the camera of the computing device. In some embodiments, the advertisement is hosted by the online service provider.

For example, the advertisement can be stored on a server of the online service provider and streamed by the online service provider to a plurality of online display devices, such as televisions, computing devices coupled to the Internet, and so forth. In some embodiments, the advertisement is stored on the server of the online service provider as image data.

The image data obtained by the online service provider from the computing device can be compared to the image data of the advertisement stored on the server of the online service provider. In some embodiments, the image data obtained by the online service provider can be processed by a neural network to identify at least a portion of the image data of the advertisement stored on the server of the online service provider. The comparison process allows the online service provider to identify the advertisement observed by the computing device that transmitted the image data of the advertisement to the online service provider.

The identified advertisement can be linked to metadata that is stored by the online service provider. The metadata can identify an entity associated with the advertisement. In some embodiments, the metadata identifies a company, business, group, or individual whose product, such as goods or services, is advertised in the advertisement. In some embodiments, the metadata includes contact information, such as an address, email address, phone number, and so forth, of the company, business, group, or individual. The online service provider can use the metadata to establish a connection between the entity associated with the advertisement and a user. The user can be linked to the computing device that captured the one or more images of the advertisement. For example, the user can be an authorized user, such as the owner, of the computing device that captured the one or more images of the advertisement. The user can also be an authorized user of the online service provider.

The user of the computing device that captured the one or more images of the advertisement can authorize dissemination of personal information, such as contact information, stored on a server of the online service provider. For example, the user can authorize the online service provider to disseminate their personal information to entities that provide advertisements through the online service provider. Thus, the online service provider, in response to obtaining the image data of the advertisement from the user's computing device incorporating the camera, can share the user's personal information with the entity associated with the advertisement. In some examples, the authorization to share personal information can be provided by the user, to the online service provider, prior to capturing an image of the advertisement and generating the image data of the advertisement. In other example, the authorization to share personal information can be provided by the user, to the online service provider, when the image data of the advertisement is provided to the online service provider. For example, the user can provide authorization to share their personal information through a user interface of the computing device that captured the one or more images of the advertisement.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) ensuring users have quick and seamless access to content, such as streaming content, thereby improving efficiencies associated with the use of computing devices; (2) reducing expenditure of computing resources previously required to allow users to access content; (3) reducing security risks and the requisite use of computing resources stemming from authentication processes required to allow users to gain access to content; and so forth.

FIG. 1 shows an illustrative example of an environment 100 in which various embodiments of the present disclosure can be practiced. In this example, the environment 100 includes a mobile phone 102. The mobile phone 102 can communicate wirelessly with an online service provider 104. The mobile phone 102 includes one or more cameras. A user of the mobile phone 102 can use the camera associated with the mobile phone 102 to capture images and generate image data determined from the captured images. The image data may be associated with a QR code or another a non-alphanumeric encoding. In some embodiments, the mobile phone 102 can be a tablet computing device, a notebook computing device, a desktop computing device, or other computing device.

The mobile phone 102 can be used to scan a QR code displayed on a television 106 or other suitable display device. The television 106 is also referred to herein as a display device. The television 106 can include an interface 108 that displays streaming media content. The streaming media content can be provided by the online service provider 104. In some embodiments, the online service provider 104 provides the streaming media content as a service to subscribing customers. In some embodiments, the online service provider 104 provides the streaming media content on behalf of a third-party streaming media content entity associated with the online service provider 104. For example, the third-party streaming media content entity may use the online service provider 104 as a hosting entity that stores media content that is streamable to customers of the third-party streaming media content entity.

The interface 108 can have multiple options that allow a user of the mobile phone 102 to receive streaming content on the display device 106 from the online service provider 104. In the illustrated example, the interface 108 includes a manual sign-in area 110. The manual sign-in area 110 can accept a username and password to gain conventional access to streaming content from the online service provider 104. The interface 108 also includes an automatic sign-in area 118. The automatic sign-in area 118 displays a QR code or another a non-alphanumeric encoding. Alternatively, other image data can be displayed in the automatic sign-in area 118. Such other image data can include an embedded code or other identification data.

The QR code can be scanned using the mobile phone 102 to obtain a code, identifier, or other identification data embedded in the QR code. The code, identifier, or other identification data can be unique data, such as a randomly generated value, assigned to the interface 108 and/or the television 106. The code can be assigned to the interface 108 as part of an approval process used to confirm that the television 106 is eligible, authorized, or approved to receive content from the online service provider 104. The approval process can be performed directly between the television 106 and the online service provider 104. In some embodiments, the television 106 conveys information to the online service provider 104 as part of the approval process. The information can include software version details of the interface 108, IP address data associated with the television 106 and the interface 108, location information, such as GPS data, of the television 106, and the like. The online service provider 104 can use the received information to authorize or enable the television 106 and the interface 108 to receive content, such as streaming audiovisual content. Based on the approval process, the online service provider 104 can generate the code that is embedded in the QR code displayed by the automatic sign-in area 118. The code can be stored in the online service provider 104 with metadata that identifies that the television 106 and the interface 108 have been authorized to receive streaming content from the online service provider 104. The metadata may include the software version of the interface 108, the IP address of the television 106 and the interface 108, location information of the television 106, and the like.

The code obtained from scanning the QR code using the mobile phone 102 can be obtained by the online service provider 104. In some embodiments, the code is transmitted to the online service provider 104 using the mobile phone 102. The online service provider 104 can use the obtained code to confirm that the television 106 and interface 108 are authorized or otherwise approved to receive streaming content from the online service provider 104. In some embodiments, the online service provider 104 searches a storage to confirm that the code obtained from scanning the QR code using the mobile phone 102 matches a code stored in the storage. Determining that the code obtained from the mobile phone 102 matches the stored code can prompt the online service provider 104 to commence streaming content to the television 106 and the interface 108. In some embodiments, the online service provider 104 can also consider stored metadata, associated with the stored code, before streaming content to the television 106 and the interface 108. The stored metadata may identify that the television 106 and/or the interface 108 are authorized to receive streaming content from the online service provider 104.

The online service provider 104 can also consider access data before streaming content to the television 106 and interface 108. The access data can be linked to a user of the mobile phone 102. In some embodiments, the access data is stored by the online service provider 104. The access data can be generated using a process to confirm or validate an identity of the user or customer of the online service provider. The access data can include username and password credential information obtained from a user authorized to consume content provided and/or stored by the online service provider 104. In some embodiments, the access data can include an access token or key. The access token or key can be generated based on an OAuth 1.0, 2.0, or 2.x open protocol authentication process.

In some embodiments, the access data is obtained by the online service provider 104 through an authentication process that occurred before the online service provider 104 obtains the code from the mobile phone 102. The authentication process with the online service provider 104 can involve the user providing credential information, such as a username and password, biometric credential data, or the access token or key, that allows the online service provider 104 to confirm that the user is authorized to receive streaming content. In some embodiments, the access data is encrypted access data comprising a username and password of a user authorized to receive content from the online service provider 104. In some embodiments, the online service provider 104 obtains the access data with the communication that provides the code scanned and obtained by the mobile phone 102.

The online service provider 104 can store personal information. In some embodiments, the online service provider 104 can provide a service that stores personal information of its customers. The stored personal information can be shared with various entities, such as private companies, medical providers, government agencies, and so forth. The stored personal information can include the name of an individual, address information, financial information, such as bank account data, credit card information, and other financial information, work history, email addresses, Social Security number, family information, education information, and so forth.

In some embodiments, an entity can generate a form or document used to collect information from an individual. For example, the entity, such as a medical provider or the DMV, can generate a form 116 that is to be completed by an individual in advance of receiving services from the entity. The form 116 can include a scannable image. In some embodiments, the scannable image is a QR code or another a non-alphanumeric encoding. The QR code can include an embedded code or other identification data. In some embodiments, an embedded code can be integrated with text on the form 116. For example, using stenography techniques, the embedded code can be hidden from the human eye yet detectable using the mobile phone 102 once an image of the form and its associated text are captured by the mobile phone 102. Alternatively, the embedded code can be in plaintext format on the form 116. The embedded code may be a unique identifier or other unique identification information or data. For example, the embedded code may be unique to the form 116.

The embedded code from the form 116 can be obtained by the online service provider 104. For example, the mobile device 102 can transmit the embedded code from the form 116 to the online service provider 104. The online service provider 104 can store copies of documents or forms used to collect information from individuals. In some embodiments, the online service provider 104 can store copies of forms as a service provided to entities, such as companies or government agencies. Each of the stored forms can have an associated code or other identification data.

The online service provider 104 can compare the embedded code obtained from the form 116 against the codes or other identification data associated with the stored forms. The comparison process can locate a stored copy of the form 116 scanned using the mobile phone 102. The online service provider 104 can analyze the copy of the form 116 to determine the personal information that the entity that provided the form 116 is seeking to obtain.

Alternatively, metadata can be associated with the codes stored by the online service provider 104. The metadata may identify the information sought by various forms used by the entities. For example, the online service provider 104 can search storage to locate the embedded code from the form 116 and obtained from the mobile phone 102. The stored code may include associated metadata that identifies the personal information that the form 116 is to obtain on behalf of an entity.

Personal information associated with customers of the online service provider 104 can be stored on one or more storages of the provider 104. The online service provider 104 can provide stored personal information requested on the form 116 to an entity. In some embodiments, the online service provider 104 can request customer approval to disseminate their personal information to the entity. The customer approval process can be achieved through the mobile phone 102. For example, the online service provider 104 can cause the mobile phone 102 to prompt a user to authorize dissemination of their personal information. Dissemination of relevant personal information that is stored by the online service provider 104 can occur in response to a user scanning the form 116 using the mobile phone 102. The authorization, provided by the user, to disseminate their personal information may be temporary. Specifically, the authorization can expire after a user selected period of time or a predetermined time selected by the online service provider 104. Alternatively, the authorization can be permanent, but revocable by the user or an authorized representative of the user.

Dissemination of the relevant personal information to the entity providing the form 116 can occur directly between the online service provider 104 and computing devices linked to the entity providing the form 116. Alternatively, the mobile phone 102 can act as an intermediary between the online service provider 104 and the computing devices linked to the entity providing the form 116. In some embodiments, personal information sought by the form 116 is delivered by the online service provider 104 to the mobile phone 102. A user of the mobile phone 102 can then select some or all of the personal information sought by the form 116 for transmission to the computing devices linked to the entity providing the form 116.

In some embodiments, a computing device can obtain an image of the form 116. For example, a user can use the mobile phone 102 to obtain the image of the form 116. The image of the form 116 can be obtained by the online service provider 104. The online service provider 104 can implement deep learning, machine learning, and/or another neural network(s) to identify or classify the image of the form 116. The personal information sharing techniques described herein can be performed once the online service provider 104 recognizes the form 116 using and based on the image of the form 116. In some embodiments, recognition of the form 116 causes the online service provider 104 to share some or all of the personal information sought by the form 116. The particulars of the personal information to be shared can be controlled by the user through the mobile phone 102. Alternatively, the user can preauthorize the sharing of their personal information through options provided by the online service provider 104. The preauthorization can be for a finite period of time, either set by the user or predefined by the online service provider 104 or the user.

In some embodiments, the described image-based information sharing techniques, methods, and systems allow an individual to share their personal information with an entity, such as a private company, medical provider, or a government agency, associated with an advertisement. For example, an advertisement 112 can be displayed on a television 114 or other display device. Alternatively, the advertisement 112 can be made via a print medium, such as a newspaper advertisement or direct mail advertisement, or via another video medium, such as an online advertisement.

The advertisement 112 can include an embedded code detectable by a computing device. For example, the embedded code associated with the advertisement may be detectable by algorithms with access to the camera's image data stream. For example, a computing device, such as the mobile phone 102, can capture an image or series of images of the advertisement 112. The computing device can process the image or series of images using image processing techniques, such as AI software and/or hardware algorithmic technology, to generate data that is analyzed to determine the embedded code. In some embodiments, the embedded code can be associated with a QR code or another a non-alphanumeric encoding. Alternatively, the embedded code can be integrated with text of the advertisement. For example, using stenography techniques, the embedded code can be hidden from the human eye yet detectable with the mobile phone 102 once an image of the advertisement and its associated text are captured by the mobile phone 102. In another example, the embedded code is in plaintext format. Alternatively, the embedded code is in a video frame or several video frames of a video advertisement, generally imperceptible to the human eye. However, the mobile phone 102 can be configured to recognize the embedded code associated with the video frame or several video frames.

The code associated with the advertisement 112 can be obtained by the online service provider 104. The online service provider 104 can store personal information of the individual that obtained the code using the mobile phone 102. The online service provider 104 can provide a service that stores personal information for its customers. The individual can transmit the code associated with the advertisement 112 to the online service provider 104 using the mobile phone 102.

Using the code received from the mobile phone 102, the online service provider 104 can identify the advertisement 112 that was scanned to obtain the embedded code. For example, the online service provider 104 can store codes that are linked to advertisements and the entities, such as companies or government agencies, associated with the advertisements.

Personal information of the individual may have been previously stored by the online service provider 104. The online service provider 104 can provide the personal information to an entity associated with the advertisement 112 that was scanned to obtain the embedded code. For example, the advertisement 112 may be for an automobile. The online service provider 104 can request that the individual authorize the dissemination of some or all of their personal information stored by the online service provider 104 to a manufacturer of the advertised automobile or an auto dealer associated with the advertised automobile. For example, the individual may be prompted, via the mobile phone 102, to authorize the dissemination of their personal information.

The online service provider 104 can also facilitate arranging a meeting between the advertiser and the individual, such as through authorized access to respective calendars of the advertiser and the individual. The online service provider 104 can also obtain or use prior authorization, in response to receiving a code linked to the advertisement 112, to send information pertinent to the advertisement to the individual. In another example, the online service provider 104 can use the obtained authorization to provide one or more samples, salient to the advertisement 112, to the individual that scanned the advertisement.

In some embodiments, the online service provider 104 can implement deep learning, machine learning, and/or another neural network(s) to identify or classify one or more images of the advertisement 112. The advertisement 112 may have an embedded or encoded code, but an embedded code is not required when the online service provider 104 implements the described image recognition techniques described herein. In some embodiments, a user may use the mobile phone 102 to capture one or more images of the advertisement 112. The online service provider 104 can obtain the captured one or more images of the advertisement 112 from the mobile phone 102. For example, in some implementations, the online service provider 104 obtains image data derived from the captured one or more images of the advertisement 112. For example, the mobile phone 102 can capture the one or more images of the advertisement 112 and convert the one or more images of the advertisement 112 to pixels. These pixels are then converted by the mobile phone 102 to numeric representations stored as image data. The image data can be packetized and transmitted to the online service provider 104.

Using the techniques described herein, the image data of the captured one or more images from the advertisement 112 can be used by the online service provider 104, aided by the deep learning, machine learning, and/or another neural network(s), to identify an entity associated with the advertisement 112. For example, the image data can be processed by a neural network to identify image data stored by the online service provider 104 that corresponds to the image data of the captured one or more images from the advertisement 112. In some embodiments, the online service provider 104 stores a version of the advertisement 112 that is streamed to remote display devices, such as televisions and other display devices coupled to a network environment such as the Internet. The image data received or obtained by the online service provider 104 can be processed by the neural network to identify matching or substantially similar image data associated with streamable advertisements hosted by the online service provider 104.

In some embodiments, the online service provider 104 stores metadata that links one or more entities to advertisements. In response to obtaining the image data of the one or more images of the advertisement 112 and identifying image data, stored by the online service provider 104, corresponding to the advertisement 112, the online service provider 104 can leverage the stored metadata to identify the entity associated with the advertisement 112. The online service provider 104 can provide the personal information to the entity associated with the advertisement 112. For example, the advertisement 112 may be for toothpaste. The online service provider 104 can request that the individual authorize the dissemination of some or all of their personal information stored by the online service provider 104 to a manufacturer of the toothpaste or a dealer associated with the advertised toothpaste. For example, the individual may be prompted, via the mobile phone 102, to authorize the dissemination of their personal information.

Figure 2:
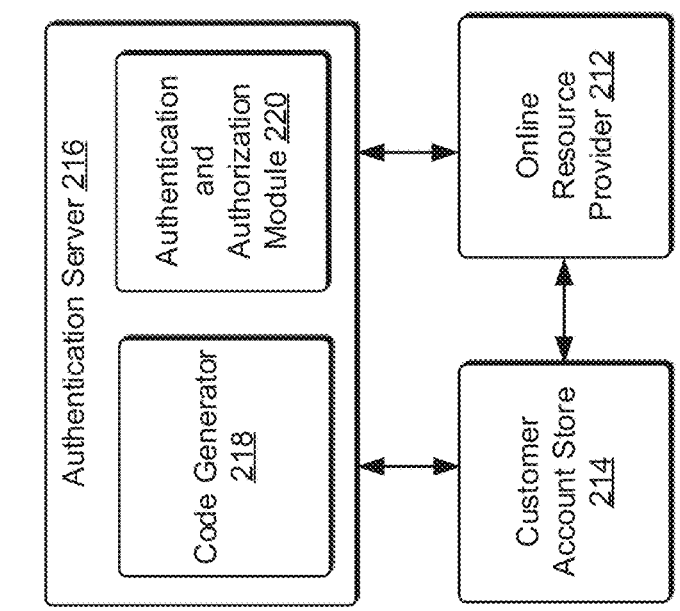
FIG. 2 is a block diagram of systems, devices, methods, and computer program products for authorizing access to account-based online resources using image data, according to various embodiments described herein.
Figure 2:
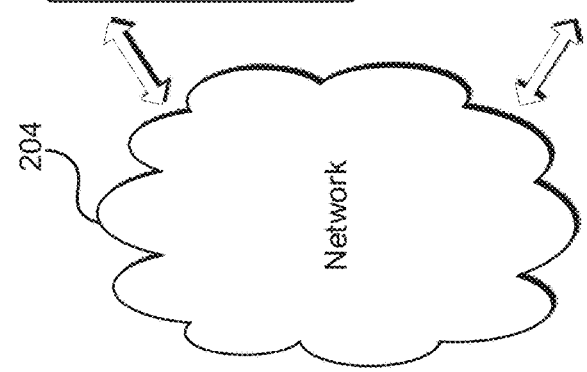
Figure 2:
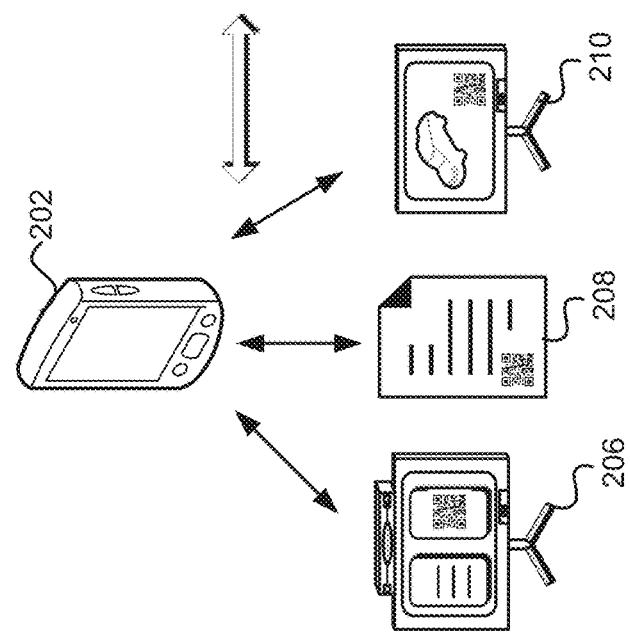

FIG. 2 is a block diagram of systems, devices, methods, and computer program products for authorizing access to account-based online resources using image data, according to various embodiments described herein. As used herein, the term account-based online resource may refer to network-accessible data, content, such as streamable content, applications, services, or combinations thereof that may require a customer account or subscription to access the content or services provided thereby. A communications environment or system 200 may include a mobile device 202 that is accessible to a user and configured for communication via a network 204. The mobile device 202 may be a wireless communication terminal, such as a cellular telephone, smartphone, electronic book reader, tablet, or other portable electronic terminal that is configured to access the network 204 over a wireless connection, wireline connection, or a combination of wireless and wireline connections. In some embodiments, the mobile device 202 may have a physical size or form factor that enables it to be easily carried, transported, or worn by a user. In some embodiments, the mobile device 202 is in the form of glasses, wearable by an individual, which couples to a computing device, such as a mobile phone or tablet computer, to leverage the computing device's processing and storage capacities. In some embodiments, the glasses have integrated processing, storage, and communication capacities that allow the glasses to function as a standalone computing device.

The mobile device 202 can incorporate a camera that is able to scan an image, such as a QR code. Furthermore, the mobile device 102 can include processing capability to process a scanned image. In some implementations, the mobile device 102 is capable of obtaining and processing image data in the same or similar manner as described with reference to the mobile phone 102 of FIG. 1. Thus, the mobile device 202 can capture an image displayed in an automatic sign-in interface displayed on a television 206. Furthermore, the mobile device 202 can capture an image displayed on a form or document 208. In addition, the mobile device 202 can capture an image displayed in an advertisement on a television 210 or another advertisement medium, such as print medium. Once captured, one or more images can be processed to generate image data. The image data can be analyzed, using image processing techniques incorporating AI software and/or hardware algorithmic technology, to determine the QR code or other embedded identification data. In some embodiments, the images and image data can be processed, such as using the mobile device 202 or the online resource provider 212, to identify or classify one or more of the images.

The devices 202, 206, and 210 are configured to access online resources, including web-based or cloud-based data, applications, and services, via the network 204. The network 204 may represent one or more of a local area network (LAN), a wide area network (WAN), an Intranet or other private network that may not be accessible by the general public, or a global network, such as the Internet or other publicly accessible network. The network 204 provides communication between the devices 202, 206, and 210 and one or more online resource providers 212 (such as web servers) configured to provide the aforementioned online data, applications, or services. The online resource provider 212 may include a network transceiver, processor, memory, and or other circuitry configured to coordinate and manage operations for delivering online resources to the devices 202, 206, and 210 via the network 204. While illustrated as a single entity in FIG. 1, it will be understood that, in some embodiments, the online resource provider 212 may represent one or more physical or virtual servers that are configured to deliver online resources to the devices 202, 206, and 210. Examples of the online resources provided by the online resource provider 212 may include, but are not limited to, web-based or cloud-based data storage services, social networking applications, shopping services, microblogging accounts, payment services, multimedia content delivery services (for delivery of online magazines, music, video, etc.) and financial services (such as credit/banking services).

The online resource provider 212 may require a subscription or customer account in order to access each of the different online resources provided thereby. As such, the system 200 also includes a customer account store 214 that contains customer account information for one or more customers, such as the user of the mobile device 202. The customer account store 214 can also contain customer account information for other entities, such as companies that store streamable content on servers of the online resource provider 212, and/or entities to obtain personal information stored by the online resource provider 212.

The customer account store 214 may be embodied in nonvolatile memory, such as flash, magnetic, or optical rewritable nonvolatile memory. The customer account information stored in the customer account store 214 may include a listing of customer accounts and online resources to which the accounts correspond. The customer accounts may include information identifying each user or customer that has registered for each online resource, such as the customer or entity's name, mailing address, e-mail address, phone number, payment information, and other personal customer information. The customer account information may also include information that may be used to verify or authenticate the customer to access the account. For example, for each customer account, the customer account information may include a username and a password selected by the customer to access the account. In some embodiments, the customer account store 214 can include access tokens or keys for each customer account. Alternatively, or in addition, the customer account store 214 can include biometric access data for each customer account.

The system 200 further includes an authentication server 216 that can authenticate and/or authorize electronic devices (such as the devices 202, 206, and 210) to access the online resource(s) provided by the online resource provider 212. The authentication server 216 may include a network transceiver, processor, memory, and/or other circuitry configured to coordinate and manage authentication and/or authorization operations via the network 204. In particular, as illustrated in FIG. 2, the authentication server 130 includes a code generator 218 and an authentication and authorization module 220. The code generator 218 and the authentication and authorization module 220 may be embodied in hardware and/or in software that runs on a processor, such as a commercially available or custom microprocessor.

The code generator 218 is configured to provide a code that may be used to access an online resource having an associated customer account. The codes provided by the code generator 218 can be, as described herein, associated with an image, such as a QR code. In some embodiments, the code may be any unique identifier, such as a randomly generated character string, and may be represented by a one-dimensional or multi-dimensional machine-readable code, such as a QR code. The code may be generated and embedded in an image that is displayed on an authorized device, such as the device 206, to receive content from the online resource provider 212. In some embodiments, the code may be generated and embedded in an image that is displayed on a document or form, such as the form 208. In some embodiments, the code may be generated and embedded in an image that is displayed in an advertisement, such as the advertisement displayed on the device 210.

In some embodiments, the code generator 218 may retrieve or select the code from a code store of the online resource provider 212. The code store can store a plurality of previously-generated codes. The plurality of previously-generated codes can be linked to devices authorized or otherwise approved to receive content from the online resource provider 212. In some embodiments, one or more of the previously-generated codes can be linked to forms and/or advertisements that include images with embedded codes.

The code provided by the code generator 218 may also include addressing information for the authentication server 216, such as an IP address or network ID. The authentication server 216 also includes a network transceiver that is configured to transmit or issue the code provided by the code generator 218 to the online resource provider 212 for embedding and presentation as an image via one of the devices 206 or 210, or for presentation on the form 208.

In some embodiments, the authentication server 216, code generator 218, authentication and authorization module 220, customer account store 214, and the online resource provider 212 are compute resources of the online service provider 104 illustrated in FIG. 1. Such compute resources can be implemented by software, hardware, or a combination of software and hardware.

Figure 3:
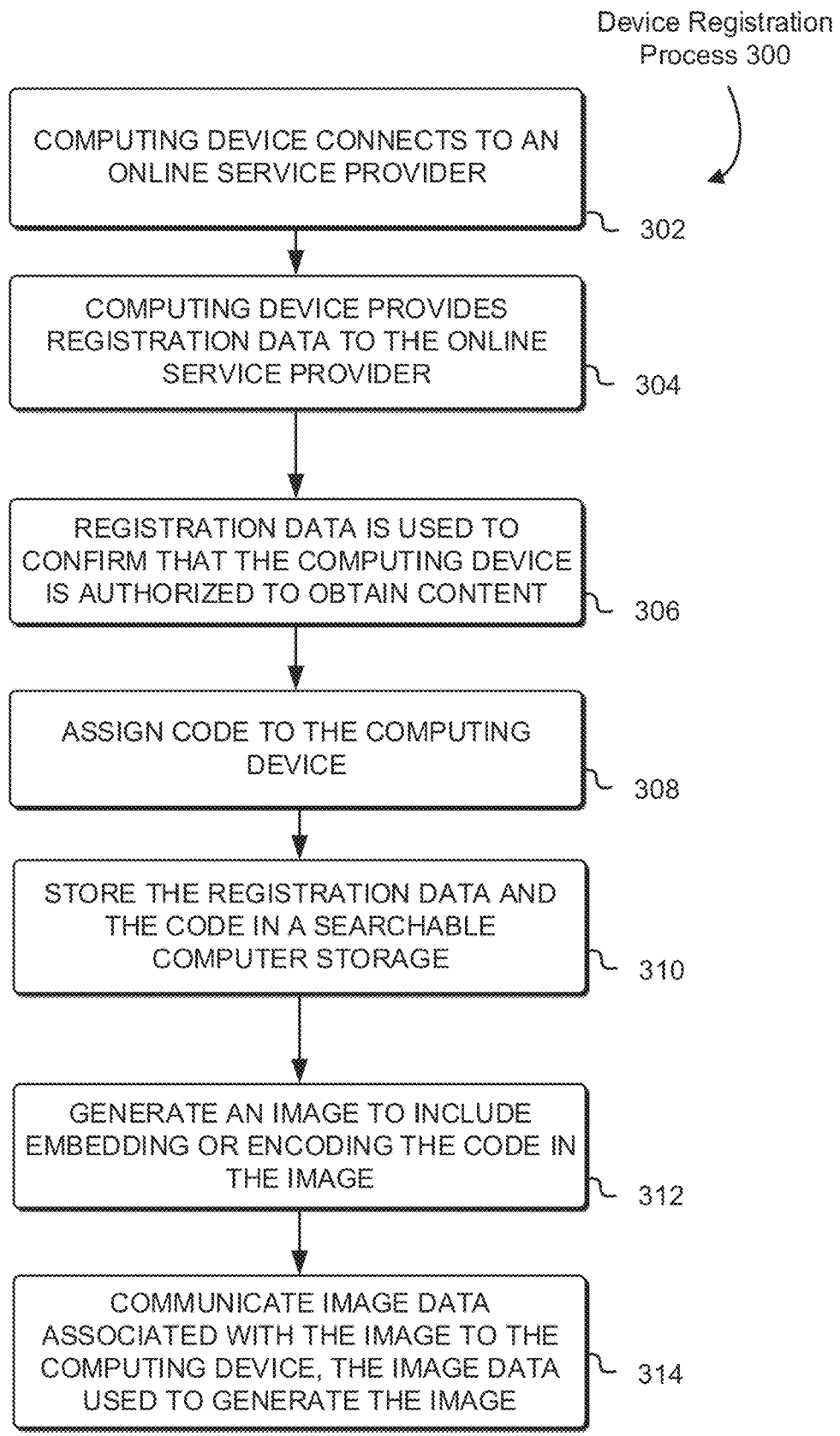
FIG. 3 illustrates a flow diagram including various processing acts, implemented by a system environment with one or more computing devices, related to use of image data to facilitate delivery of content or sharing of information.

FIG. 3 illustrates a flow diagram 300 including various processing acts, implemented by a system environment with one or more computing devices, related to use of an image to facilitate delivery of content or sharing of information. In some implementations, the acts of the flow diagram 300 are executed by one or more computing devices illustrated in FIGS. 1-2 and 7. The illustrated computing devices can execute computer-executable instructions incorporating at least some of the processing acts of the flow diagram 300 to register a computing device as being authorized to receive content, such as streamed content from an online service provider.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on a computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules might be implemented in software, in firmware, in special purpose digital logic, and any combination thereof.

At 302, a computing device connects to an online service provider. In some embodiments, the computing device is a television, such as the television 106 or the television 206. The computing device can include an interface to receive content. That same interface can facilitate connecting the television, wirelessly and/or via wireline connectivity, to the online service provider. The interface can be the interface 108 illustrated in FIG. 1. In some embodiments, the interface is to receive audio or video content streamed from the online service provider. The connection established between the computing device and the online service provider can be a web socket connection.

At 304, the computing device can provide registration data to the online service provider. The registration data can be used by the online service provider to confirm that the computing device is authorized or otherwise approved to obtain content from the online service provider. In some embodiments, the online service provider provides at least one service that allows customers of the service to receive content, such as streamed content comprising television shows, movies, and the like. In some embodiments, the registration data can include location data of the computing device, software version information of the interface to receive audio or video content streamed from the online service provider, hardware information, such as processing and memory information, associated with the computing device, one or more IP addresses of the computing device, and so forth.

At 306, the online service provider uses the registration data to confirm that the computing device is authorized or otherwise approved and/or capable of obtaining content from the online service provider. In some embodiments, the online service provider uses software version information of the interface, received in the registration data, to confirm that the computing device is authorized or otherwise approved and/or capable of obtaining content from the online service provider. The online service provider can also use hardware information and location data included in the registration data to confirm that the computing device is authorized or otherwise approved and/or capable of obtaining content from the online service provider.

At 308, the online service provider assigns a code to the computing device, which is authorized or otherwise approved to obtain content from the online service provider. The code can be a randomly generated code. The code can be a unique code.

At 310, the online service provider stores at least some of the registration data provided by the computing device in a storage or database. Additionally, the online service provider associates the code assigned to the computing device with the stored registration data. In some embodiments, the registration data and the linked or associated code are stored in a searchable manner, such as in a database maintained by the online service provider.

At 312, the online service provider generates a unique identifier code, image, or image data that can be processed to generate an image. In some embodiments, the image comprises the code assigned to the computing device. In some embodiments, the image is a QR code. In some embodiments, the image is a barcode. In some embodiments, the image is a picture of an object, such as a randomly selected object. In some embodiments, the code assigned to the computing device is embedded or encoded in the image. In some embodiments, an identifier code is sent to the computing device and an image or computer-readable code is generated locally on the computing device for display to user.

At 314, the online service provider communicates the image data associated with the image to the computing device. The image data can be processed to generate an image that can be displayed by the computing device. The image can facilitate frustration-free access to content provided by the online service provider. In some embodiments, the online service provider, rather than communicating the image data, communicates the code assigned to the computing device. In response to receiving the code, the computing device can generate the image that is for display thereby.

Figure 4:
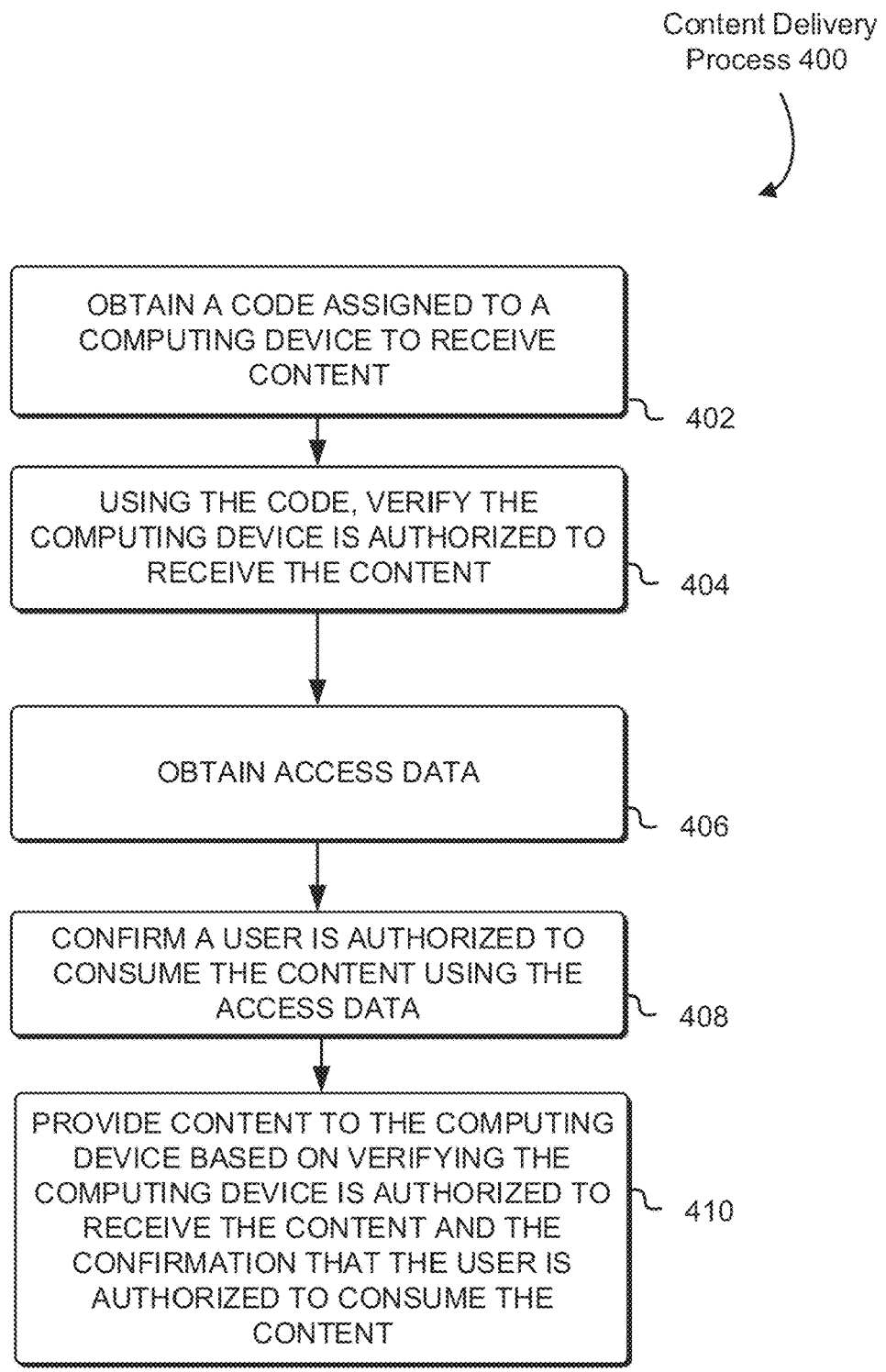
FIG. 4 illustrates another flow diagram including various processing acts, implemented by a system environment with one or more computing devices, related to use of image data to facilitate delivery of content or sharing of information.

FIG. 4 illustrates a flow diagram 400 including various processing acts, implemented by a system environment with one or more computing devices, related to use of an image to facilitate delivery of content or sharing of information. In some implementations, the acts of the flow diagram 400 are executed by one or more computing devices illustrated in FIGS. 1-2 and 7. The illustrated computing devices can execute computer-executable instructions incorporating at least some of the processing acts of the flow diagram 400 to deliver content, such as streamed content, to a computing device registered and/or authorized or otherwise approved to receive the content.

At 402, a code assigned to a computing device to receive content is obtained. In some embodiments, the computing device is a television, such as the television 106 or the television 206. In some embodiments, the code is obtained from scanning an image, such as an image displayed on a television. The image may be associated with a QR code. In some embodiments, the code is embedded in the image. The image may be displayed by an interface capable of receiving and displaying streamed content. In some embodiments, the code is obtained from scanning the image using a mobile device, such as a mobile phone that comprises a camera. In some implementations, the mobile phone 102 or the mobile device 202 scans the image.

At 404, the code assigned to the computing device is used to verify that the computing device is authorized or otherwise approved to receive the content. In some embodiments, a computer storage is searched or otherwise queried to confirm that the code matches a stored code. Furthermore, in some embodiments, stored metadata, associated with the stored code, can be reviewed to verify that the computing device is authorized or otherwise approved to receive the content. The metadata can include identification data of the computing device, such as data identifying a software interface hosted by the computing device and capable of receiving content from the online service provider, data identifying hardware of the computing device, and so forth.

At 406, access data is obtained. In some embodiments, the access data is obtained from a computing device that scans the image. Alternatively, in some embodiments, the access data is obtained from the computing device that is to receive the content. For example, the access data can be obtained from the computing device that is assigned the code referenced at 402 and 404. In some embodiments, the access data is a bearer token or key, such as a token or key generated in accordance with the OAuth 1.0, 2.0, or 2.x open protocol. In some embodiments, the access data obtained by the computing device that is to receive the content can be used to by the computing device to show authorization, to a content provider and on behalf of a user, to receive the content. In some embodiments, the access data is provided to the computing device that is to receive the content, subsequent to the content provider having received the code from the computing device that scanned the image. In some embodiments, the access data is stored by the content provider. After obtaining the code based on the scanned image, the content provider may communicate the access data to the computing device that displayed the image. The computing device can use the access data to obtain access to content provided by the content provider.

The access data can be generated using a process to confirm or validate an identity of a user or customer of the online service provider. The access data can comprise an access token or key. The access token or key can be assigned to the computing device, such as the computing device that scanned an image comprising a code, in response to an authentication process that confirms a user is authorized to consume content provided by an online service provider. The authentication process can occur prior to obtaining the code based on the scanned image. In some embodiments, the access data is stored by an online service provider that provides the content.

At 408, the access data is used to confirm that a user is authorized to consume content provided by the online service provider. In some embodiments, the access data is used to confirm that the user has registered for a service, provided by the online service provider or a third party associated with the online service provider, that provides content for consumption by the user. The content can include streamable audiovisual content, such as movies and/or television shows.

At 410, content is provided to the computing device. The content is provided in response to verifying that the computing device is authorized or otherwise approved to receive content from the online service provider. In some embodiments, the content is provided in response to confirming that a user is authorized to access content provided by the online service provider.

Figure 5:
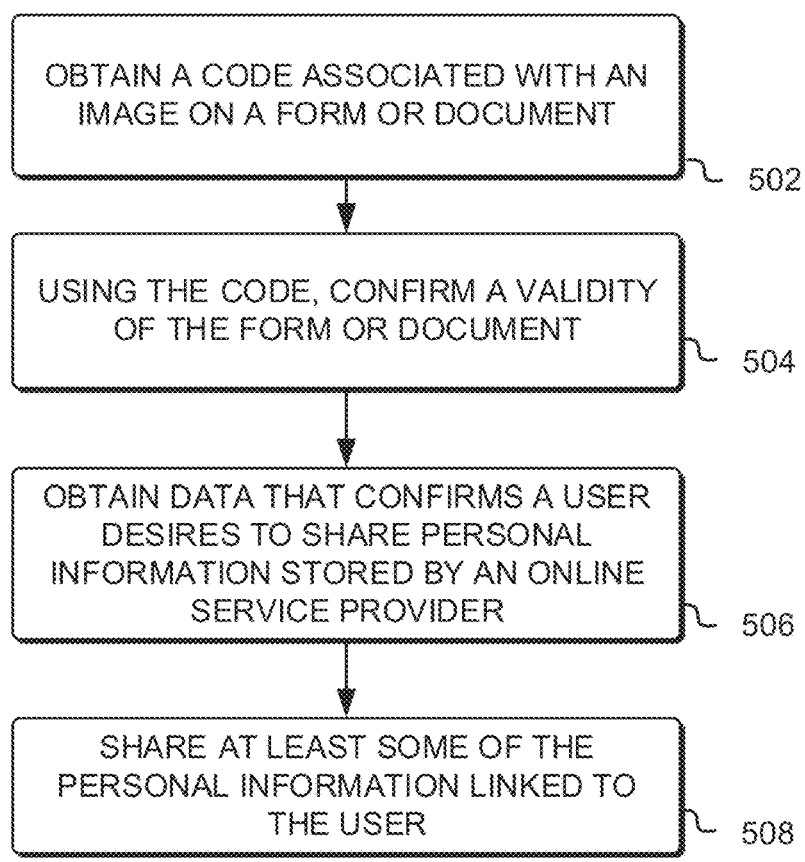
FIG. 5 illustrates another flow diagram including various processing acts, implemented by a system environment with one or more computing devices, related to use of image data to facilitate delivery of content or sharing of information.

FIG. 5 illustrates a flow diagram 500 including various processing acts, implemented by a system environment with one or more computing devices, related to use of image data to facilitate delivery of content or sharing of information. In some implementations, the acts of the flow diagram 500 are executed by one or more computing devices illustrated in FIGS. 1-2 and 7. The illustrated computing devices can execute computer-executable instructions incorporating at least some of the processing acts of the flow diagram 500 to share information, such as personal information, based on a code obtained from scanning an image on a form or document.

At 502, a code is obtained. In some embodiments, the code can be associated with a document or form used to obtain information from an individual. The document or form can be the form 116 illustrated in FIG. 1 and/or the form 208 illustrated in FIG. 2. The code can be associated with an image on the form. The image can be a QR code. In some embodiments, the image is displayed on a display device or other medium that informs individuals that an entity is seeking personal information from the individuals. The entity can be a company or a government agency that provides services to the individuals. For example, the entity can be a medical provider or the DMV. In some embodiments, the code can be obtained based on scanning performed using a mobile device, such as the mobile phone 102 or the mobile device 202.

At 504, the code is used to confirm a validity of the form. In some embodiments, the code is used to confirm that an entity has registered with an online service provider to obtain personal information stored by the online service provider. In some implementations, the code is obtained by the online service provider. The online service provider can compare the code against stored codes to confirm that a valid form is associated with the code. In some embodiments, the online service provider stores forms or documents and links a unique code to each of the stored forms or documents.

Therefore, the obtained code can be compared against stored codes to determine the validity of the form. In some embodiments, the online service provider can communicate with a third party that generates codes linked to forms or documents and stores those generated codes to facilitate the described techniques for sharing personal information. As described, the personal information can be stored by the online service provider. In some embodiments, the personal information can be stored by the third party that generates codes linked to the forms or documents.

At 506, data is obtained that confirms a user desires to share personal information stored by the online service provider. In some embodiments, the data includes an authorization, provided through a computing device, that confirms that the user authorizes the online service provider to share at least some of their personal information stored by the online service provider. In some embodiments, a preauthorization, provided by the user, allows the online service provider to share at least some of their personal information stored by the online service provider.

At 508, based on the data that confirms that the user desires to share personal information, at least some of the personal information linked to the user and stored by the online service provider is communicated to an entity associated with the document or form that included the image comprising the code. In some embodiments, the personal information can be obtained by one or more computing devices associated with the entity.

In some embodiments, personal information can be shared based on geolocation techniques. For example, a user's mobile device can be configured to share location data. An entity, such as a medical provider or the DMV, can obtain the shared location data. The location data can be obtained by the online service provider that stores customer personal information. The location data can be obtained from a user's mobile device. In some embodiments, the location data can be obtained from the entity to receive a customer's personal information. The shared location data can be analyzed by the online service provider to determine identification data of the entity to receive the customer's personal information. The identification data can include a name of the entity, the location of the entity, data identifying the types of personal information sought by the entity, and so forth. Based on the identification data and the shared location data, the online service provider can share the customer's personal information with the entity. A computing device associated with the customer can be used to obtain authorization to share the personal information. For example, the computing device can be configured to prompt the customer to authorize sharing of some or all of their personal information stored by the online service provider. In some implementations, a preauthorization to share some or all the personal information stored by the online service provider can be granted, by the customer, to the online service provider.

Figure 6:
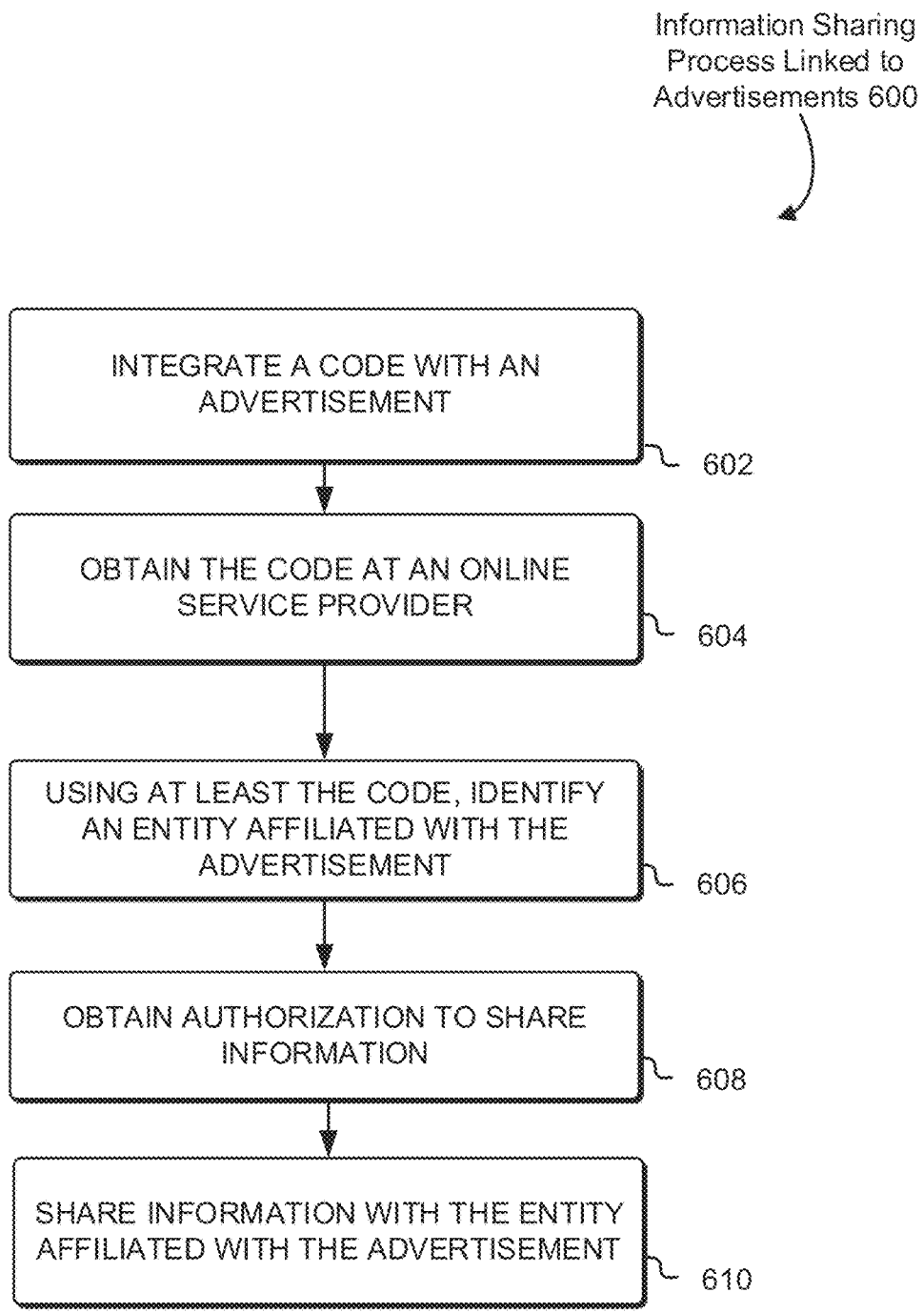
FIG. 6 illustrates a flow diagram including various processing acts, implemented by a system environment with one or more computing devices, related to use of image data to facilitate delivery of content or sharing of information.

FIG. 6 illustrates a flow diagram 600 including various processing acts, implemented by a system environment with one or more computing devices, related to use of image data to facilitate delivery of content or sharing of information. In some implementations, the acts of the flow diagram 600 are executed by one or more computing devices illustrated in FIGS. 1-2 and 7. The illustrated computing devices can execute computer-executable instructions incorporating at least some of the processing acts of the flow diagram 600 to share information, such as personal information, based on a code obtained from scanning an image on an advertisement.

At 602, a code is integrated with an advertisement for one or more products. In some embodiments, the code is embedded in an image. The image can be a QR code. The QR code can be displayed with the advertisement. In some embodiments, the QR code is part of an advertisement for display on a display device. In some embodiments, the QR code is part of an advertisement in print medium. In some embodiments, the advertisement is stored by an online service provider. The online service provider may cause the code to be integrated with the advertisement. Specifically, in some embodiments, the online service provider can generate the QR code and integrate the generated QR code with the advertisement. The code can be stored by the online service provider and associated with the advertisement. The stored code can be used by the online service provider to identify an entity that is associated with the advertisement. The entity can be a company that provides a product or several products that are included in the advertisement.

At 604, the code is obtained. In some embodiments, the advertisement is scanned by a computing device, such as the mobile phone 102 or the mobile device 202, to determine the code. In some embodiments, the computing device determines the code by scanning a QR code integrated with the advertisement. The computing device can communicate the code to an online service provider. The online service provider may therefore obtain the code from the computing device.

At 606, the obtained code can be used to identify an entity that is associated or affiliated with the advertisement. In some embodiments, codes stored by the online service provider are searched or otherwise queried to identify the entity that is associated or affiliated with the advertisement.

At 608, an authorization to share contact information with the entity associated with the advertisement is obtained. In some embodiments, the authorization is provided by a user of the online service provider. The contact information can be stored by the online service provider. The authorization can be provided through a mobile device that scans the code integrated with the advertisement.

At 610, based on the authorization to share the contact information, contact information is shared with the entity associated with the advertisement. In some embodiments, the contact information can comprise telephone information, address information, email information, other personal information, and so forth.

In some embodiments, the online service provider can implement deep learning, machine learning, and/or another neural network(s) to identify or classify one or more images of the advertisement at 602 and/or image data of the one or more images of the advertisement. The advertisement may have an embedded or encoded code, but an embedded code is not required when the online service provider implements the image recognition techniques described herein. In some embodiments, a user may use the mobile phone to capture one or more images of the advertisement. The online service provider can obtain the captured image data of one or more images of the advertisement from the mobile phone. Using the techniques described herein, the captured image data of one or more images from the advertisement can be used by the online service provider, aided by the deep learning, machine learning, and/or another neural network(s), to identify an entity associated with the advertisement. For example, a neural network can be used to associate an advertisement stored by the online service provider with the image data of the one or more images from the advertisement captured by the mobile phone.

In some embodiments, the online service provider stores metadata that links one or more entities to advertisements. In response to obtaining the image data of the one or more images of the advertisement, the online service provider can leverage the stored metadata to identify the entity associated with the advertisement. The online service provider can provide the personal information to the entity associated with the advertisement. For example, the advertisement may be for toothpaste. The online service provider can request that the individual authorize the dissemination of some or all of their personal information stored by the online service provider to a manufacturer of the toothpaste or a dealer associated with the advertised toothpaste. For example, the individual may be prompted, via the mobile phone, to authorize the dissemination of their personal information.

The following use examples of the disclosed embodiments describe numerous advantages of the techniques, processes, and systems that provide image-based access to data.

Any device that requires a login and is connected to the Internet can use some or more the disclosed techniques. The disclosed techniques are more secure than traditional keyboard logins because the described authorization and access data cannot be intercepted via keyloggers, surveillance cameras, or other casual observers. For example, an ATM could use the disclosed techniques rather than requesting a PIN. This would eliminate the common vectors for card skimming at banks, gas stations, or other merchants. Taking this one step further, the credit and/or debit cards could be eliminated, allowing smartphones to independently authorize transactions using the disclosed techniques.

A long-time user of a streaming content provider visits a hotel that provides televisions that implement the disclosed techniques. The user scans a code on a television using an application, running on their mobile phone, provided by the streaming content provider. The user is watching streaming content from the provider within seconds.

A user, such as a frequent traveler, can be shown a QR code on the television in their hotel room. The user can scan the QR code using a mobile device, which prompts the user to install a streaming content application on their mobile device. The user can be offered a free trial to receive streaming content from an online service provider associated with the application. The user is watching streaming content within minutes after scanning the QR code. In addition, when the user returns to her residence, the user can use the scanning function within the streaming content application to install the streaming content application on televisions at her residence.

Companies can track where and when users interact with advertisements. In a television advertisement, a code could be displayed or integrated with the advertisement. Users scanning this code would be prompted to securely share their e-mail address or phone number with an entity associated or affiliated with the advertisement. The entity can contact the interested customer, and also can capture when and where the advertisement was viewed. This data is valuable to advertisers and can be captured and analyzed using one or more online service providers associated with the advertisement. Personal data would only need to be entered once, such as via an application of the online service provider, and forever shared securely as the user requests or authorizes.

An advertisement, integrating the code according to the described embodiments, for a food product can be scanned using an application associated with an online service provider. A user can be offered a free sample of the food product. This makes advertising interactive and provides an anonymized and frictionless connection with customers.

The described embodiments allow forms to be automated and no longer require manual entry and transcription. Individuals can visit a doctor's office and scan a code on a patient form using an application on their smartphone. The phone can provide a prompt asking if the user approves sharing information with their doctor, and lists the requested personal data one-by-one. By confirming, the user's information is instantly shared. The foregoing process curtails transcription errors, and all personal data could be securely stored in HIPAA-compliant storage of an online service provider. The online service provider becomes the trusted repository of medical and other personal data and secure interchange of such personal data. In some scenarios, users could retain control of their personal data and revoke access when necessary.

In some implementations, image data from advertisements captured by a user's computing device can be stored in a computer storage, such as a database of the computer storage, of the online service provider. As described herein, entities associated with the advertisements can be identified through image data analysis and metadata linked to those advertisements. In some embodiments, when the user connects to the online service provider, such as when the user logs in to the online service provider, the online service provider can offer a free trial offer or discount on the products, such as goods or services, advertised in the advertisements captured by the user's computing device. These free trial offers or discounts can be authorized by the entities associated with the advertisements. Furthermore, users of the online service provider can provide authorization to automatically receive such free trial offers or discounts related to products in advertisements captured by user computing devices.

In some embodiments, as a variation to the advertisement embodiments described herein, a user can use a computing device to capture an image of a product in real time. For example, the user can use a digital camera associated with a computing device to capture an image of their neighbor's new automobile, bicycle, or television. The computing device can communicate image data of the captured image to an online service provider. The online service provider can analyze the image data, such as using a neural network trained with image data from many products available through the online service provider's digital marketplace, to identify one or more products in the captured image associated with the received image data. The online service provider can provide user personal information, such as contact information, to entities associated with the identified one or more products in the captured image. Such entities can include manufacturers of the one or more products, advertisers of the one or more products, businesses that offer the one or more products for purchase, and so forth. In some embodiments, in response to obtaining the image data of the captured image of the product, the online service provider, based on successful analysis of the image data and identification of an entity associated with the product, can message or otherwise contact the user of the computing device to ascertain if they would like a free sample the product, direct the user to a location to purchase the product or test the product (e.g., test drive a vehicle or bicycle), establish an appointment with the entity associated with the product, and the like.

At least one embodiment of the disclosure can be described in view of the following clauses:

Clause 1. A computer-implemented method, comprising: obtaining, from a first computing device, a code assigned to a second computing device to receive media content, the code obtained from an image displayed by the second computing device; based on the code, verifying the second computing device is authorized to receive the media content; obtaining access data from the first computing device; based on the access data, confirming a user of the first computing device is authorized to access the media content; and providing a method to access the media content to the second computing device in response to verifying the second computing device is authorized to receive the media content and further in response to confirming the user of the first computing device is authorized to access the media content.

Clause 2. The computer-implemented method of clause 1, wherein the image is a quick response (QR) code image and the code assigned to the second computing device is obtained by scanning the QR code image using a camera of the first computing device and processing the scanned QR code image to determine the code.

Clause 3. The computer-implemented method of clause 1 or 2, wherein verifying the second computing device is authorized to receive the media content comprises: searching a storage to locate a stored code that matches the code obtained from the first computing device; and verifying metadata, associated with the stored code, identifies the second computing device, the metadata further specifying that the second computing device is authorized to receive the media content.

Clause 4. The computer-implemented method of at least one or more of the clauses 1-3, wherein the access data comprises credential data usable to confirm the user of the first computing device is authorized to access the media content or an access token provided by the first computing device to confirm the user of the first computing device is authorized to access the media content, the access token obtained by the first computing device based on a prior authentication process that generated the access token.

Clause 5. A system, comprising: one or more processors; and memory that stores computer-executable instructions that are executable by the one or more processors to cause the system to: obtain an identifier associated with a scannable image, the identifier linking a computer-hosted application to a service that provides content; obtain access data; use the access data to confirm access to the service that provides the content; and based on the identifier and the access data, allow the computer-hosted application to access the content.

Clause 6. The system of clause 5, wherein the service that provides the content is an entity that provides streaming content.

Clause 7. The system of clause 6, wherein the streaming content is video streaming content or audio streaming content.

Clause 8. The system of at least one of clauses 5-7, wherein the access data comprises credential data usable to confirm a user is authorized to access the content.

Clause 9. The system of at least one of clauses 5-8, wherein the access data comprises an access token provided to confirm a user is authorized to access the content, the access token obtained based on a prior authentication process that generated the access token.

Clause 10. The system of at least one of clauses 5-9, wherein the scannable image is a quick response (QR) code and the identifier is obtained by scanning the QR code using a camera of a computing device and processing the scanned QR code to determine the identifier.

Clause 11. The system of at least one of clauses 5-10, wherein the computer hosted application is an application to receive streaming media content comprising audiovisual streaming media content.

Clause 12. The system of at least one of clauses 5-11, wherein the computer-executable instructions that are executable by the one or more processors further to cause the system to: search a storage to locate a stored identifier that matches the identifier associated with the scannable image; and verify metadata, associated with the stored identifier, specifies that the computer hosted application is authorized to receive the content.

Clause 13. A non-transitory computer-readable storage medium storing thereon executable instructions that, as a result of being executed by one or more processors of a computer system, cause the computer system to: obtain identification data, the identification data obtained from processing image data using a first computing device; obtain access data from the first computing device; and based on the identification data and the access data, provide content to a second computing device, the second computing device associated with the image data processed by the first computing device.

Clause 14. The non-transitory computer-readable storage medium of clause 13, wherein the first computing device comprises a camera, at least the camera used to process an image comprising the image data.

Clause 15. The non-transitory computer-readable storage medium of at least one of clauses 13-14, wherein the image is a quick response (QR) code and the identification data is obtained by scanning the QR code using a mobile phone, the mobile phone processing the scanned QR code to determine the identification data.

Clause 16. The non-transitory computer-readable storage medium of at least one of clauses 13-15, wherein the executable instructions that, as a result of being executed by one or more processors of a computer system, further cause the computer system to: search a database storage to locate stored identification data that matches the identification data; and verify metadata, associated with the stored identification data, specifies that the second computing device is authorized to receive the content.

Clause 17. The non-transitory computer-readable storage medium of at least one of clauses 13-16, wherein the access data comprises credential data usable to confirm a user is authorized to access the content.

Clause 18. The non-transitory computer-readable storage medium of at least one of clauses 13-17, wherein the access data comprises an access token obtained based on a prior authentication process that generated the access token.

Clause 19. The non-transitory computer-readable storage medium of at least one of clauses 13-19, wherein the content is streamed content comprising streamed audiovisual content.

Clause 20. The non-transitory computer-readable storage medium of at least one of clauses 13-19, wherein the second computing device is a television to receive streamed audiovisual content.

Clause 21. A computer-implemented method or system, comprising: obtaining, from a camera, a code associated with a document used to obtain information, the code obtained from an image on the document; confirming a validity of the document using the code; obtaining data confirming that a user desires to share personal information stored in a storage of an online service provider; and in response to the data confirming that the user desires to share the personal information, communicating at least a portion of the personal information to one or more computing devices associated with an entity that provides the document used to obtain the information, the portion of the personal information communicated to the one or more computing devices at least delimited by the information solicited using the document.

Clause 22. A computer-implemented method or system, comprising: obtaining a code embedded in an image, the code obtained from a computing device that scanned the image, and the image displayed by an entity to obtain information from one or more individuals; confirming the code is recognized by an online service provider; locating information, stored by the online service provider, linked to a user associated with the computing device; confirming the user wishes to share at least some of the information linked to the user; and transmitting the at least some of the information to a server computing device associated with the entity.

Claus 23. A computer-implemented method or system, comprising: obtaining a code embedded in a form, the code obtained from a computing device that scanned the form, and the form used to obtain information from one or more individuals; confirming the code is recognized by an online service provider; locating information, stored by the online service provider, linked to a user; obtaining authorization to share at least some of the information linked to the user; and transmitting the at least some of the information to a server computing device associated with an entity that provides access to the form.

Clause 24. A computer-implemented method or system, comprising: integrating a quick response (QR) code with an advertisement for one or more products, the advertisement for the one or more products to display on a display device; obtaining a code in response to a computing device scanning the QR code; using the code, identifying an entity affiliated with the advertisement for the one or more products; obtaining authorization to share contact information with the entity, the contact information stored by an online service provider; and sharing the contact information with the entity.

Clause 25. A computer-implemented method or system, comprising: associating a unique code with an advertisement for one or more items, the unique code detectable using a camera; obtaining the unique code from a computing device; using the unique code, identifying a company affiliated with the advertisement for the one or more products; identifying authorization to share personal information with the company affiliated with the advertisement for the one or more products; and sharing the personal information with the company.

Clause 26. A computer-implemented method or system, comprising integrating data with a video advertisement, the data detectable using a camera of a computing device, the data imperceptible by human eyesight; obtaining the data integrated with the video advertisement from the computing device; using the data to identify an entity associated with the video advertisement; identifying authorization to share personal information with the entity associated with the video advertisement; and sharing the personal information with the entity.

Clause 27. A computer-implemented method, comprising: obtaining, from a first computing device, a code assigned to a second computing device to receive media content, the code obtained from an image displayed by the second computing device; based on the code, verifying the second computing device is authorized to receive the media content; obtaining access data from the first computing device, the access data generated based on an authentication process to verify an identity of a user of the first computing device; based on the access data, confirming the user of the first computing device is authorized to access the media content; and streaming the media content to the second computing device in response to verifying the second computing device is authorized to receive the media content and further in response to confirming the user of the first computing device is authorized to access the media content.

Clause 28. The computer-implemented method of clause 27, wherein the image is a quick response (QR) code image and the code assigned to the second computing device is obtained by scanning the QR code image using a camera of the first computing device and processing the scanned QR code image to determine the code, and wherein the QR code image is to be displayed in an application of the second computing device to obtain the media content.

Clause 29. The computer-implemented method of at least one of clauses 27-28, wherein verifying the second computing device is approved to receive the media content comprises: searching a computer storage to locate a stored code that matches the code obtained from the first computing device; and verifying metadata, associated with the stored code, identifies the second computing device, the metadata further specifying that the second computing device is authorized to obtain the media content.

Clause 30. The computer-implemented method of at least one of clauses 27-29, wherein the access data comprises an access token provided by the first computing device to confirm the user of the first computing device is authorized to access the media content, the access token obtained by the first computing device based on an authentication process that generated the access token, the authentication process generates the access token executed prior to obtaining the code assigned to the second computing device.

Clause 31. A system, comprising: one or more processors; and memory that stores computer-executable instructions that are executable by the one or more processors to cause the system to: obtain an identifier associated with a scannable image, the identifier linking a computer-hosted application to a service that provides content; obtain access data; use the access data to confirm a user is authorized to access the service that provides the content; and based on the identifier and the access data, allow the computer-hosted application to access the content provided by the service.

Clause 32. The system of clause 31, wherein the scannable image comprises a non-alphanumeric encoding of the identifier, the identifier obtained based on a process that authorizes the computer-hosted application to obtain the content provided by the service.

Clause 33. The system of clause 32, wherein the identifier is determined by scanning a non-alphanumeric encoding of the identifier using a camera of a computing device and processing the scanned non-alphanumeric encoding of the identifier to determine the identifier, and obtaining the identifier comprises receiving the identifier from the computing device that scanned the non-alphanumeric encoding of the identifier.

Clause 34. The system of at least one of clauses 31-33, wherein the access data comprises credential data usable to confirm a user is authorized to access the content, the access data obtained based on a prior authentication process that generated the access data.

Clause 35. The system of at least one of clauses 31-34, wherein the access data comprises an access token provided to confirm a user is authorized to access the content, the access token obtained based on a prior authentication process that generated the access token, the prior authentication process performed by the service and the access token provided to a computing device to scan the scannable image.

Clause 36. The system of at least one of clauses 31-35, wherein the scannable image is a quick response (QR) code and the identifier is obtained by scanning the QR code using a camera of a computing device and processing the scanned QR code to determine the identifier.

Clause 37. The system of at least one of clauses 31-36, wherein the computer-hosted application is an application to receive streamed media content comprising audiovisual media content, and the application displays the scannable image to, at least in part, allow the user to consume the streamed media content via the computer hosted application.

Clause 38. The system of at least one of clauses 31-37, wherein the computer-executable instructions that are executable by the one or more processors further to cause the system to: query a computer storage to locate a stored identifier that matches the identifier associated with the scannable image; and verify metadata, associated with the stored identifier, specifies that the computer hosted application is authorized to receive the content.

Clause 39. A non-transitory computer-readable storage medium storing thereon executable instructions that, as a result of being executed by one or more processors of a computer system, cause the computer system to: obtain identification data, the identification data obtained from processing image data using a first computing device; obtain access data associated with the first computing device; and based on the identification data and the access data, provide data to a second computing device, the second computing device associated with the image data processed by the first computing device.

Clause 40. The non-transitory computer-readable storage medium of clause 39, wherein the image data is obtained from an image displayed on a display device of the second computing device, the image displayed in an application of the second computing device, the application to obtain the data from an online service provider based on at least the identification data.

Clause 41. The non-transitory computer-readable storage medium of at least one of clauses 39-40, wherein the image data is associated with a quick response (QR) code and the identification data is obtained by scanning the QR code using a mobile phone, the mobile phone to process the image data to determine the identification data, and wherein the identification data at least confirms that the second computing device is authorized to obtain the data.

Clause 42. The non-transitory computer-readable storage medium of at least one of clauses 39-41, wherein the executable instructions that, as a result of being executed by one or more processors of a computer system, further cause the computer system to: search a database storage to locate stored identification data that matches the identification data; and verify metadata, associated with the stored identification data, specifies that the second computing device is approved to receive the data.

Clause 43. The non-transitory computer-readable storage medium of at least one of clauses 39-42, wherein the access data comprises credential data usable to confirm a user is authorized to access the data, the credential data obtained based on a prior authentication process that obtained the credential data.

Clause 44. The non-transitory computer-readable storage medium of at least one of clauses 39-43, wherein the access data comprises an access token obtained based on a prior authentication process that generated the access token.

Clause 45. The non-transitory computer-readable storage medium of at least one of clauses 39-44, wherein the data is streamed content comprising streamed audiovisual content, the streamed audiovisual content to be obtained by an application hosted by the second computing device, and wherein the application hosted by the second computing device is to display an image comprising the image data.

Clause 46. The non-transitory computer-readable storage medium of at least one of clauses 39-45, wherein the image is a non-alphanumeric encoding of the identification data, the identification data determined using a camera of the first computing device and processing of the non-alphanumeric encoding performed by the first computing device.

Clause 47. A computer-implemented method, comprising: obtaining, from a computing device, image data associated with an advertisement for one or more products, the computing device providing the image data based on an image of the advertisement obtained by the computing device; processing the image data to identify an entity affiliated with the advertisement for one or more products, the image data processed by an online service provider hosting the advertisement for the one or more products; obtaining authorization to share contact information with the entity, the contact information stored by an online service provider, wherein the authorization to share the contact information is provided by a user of the online service provider and the computing device; and share the contact information with the entity.

Clause 48. The computer-implemented method of clause 47, wherein the advertisement for the one or more products is a video advertisement and the image data is based on an image of the video advertisement obtained by the computing device, and wherein processing the image data to identify the entity comprises processing the image data using a neural network to identify at least a portion of the video advertisement for the one or more products, the portion of the video advertisement for the one or more products stored on a server of the online service provider.

Clause 49. The computer-implemented method of at least one of clauses 47-48, wherein image data comprises a code determined from a quick response (QR) code displayed with the advertisement for one or more products, the code obtained by the computing device based on an image of the advertisement for one or more products acquired by the computing device, and wherein processing the image data comprises searching a server of the online service provider to locate a stored code that matches the code obtained by the computing device.

Clause 50. The computer-implemented method of at least one of clauses 47-49, wherein obtaining authorization to share the contact information with the entity comprises determining a user of the computing device authorized sharing of the contact information to entities that advertise at least in part through the online service provider, and wherein the contact information comprises at least a name of the user and an item of information usable by the entity to contact the user.

Clause 51. A system, comprising: one or more processors; memory that stores computer-executable instructions that are executable by the one or more processors to cause the system to: store, on a server of an online service provider, at least a portion of an advertisement; obtain first image data, from a computing device, acquired from a presentation of the advertisement; confirm the first image data corresponds to second image data, the second image data determined from the portion of the advertisement stored on the server of the online service provider; and share personal information at least in part based on confirming the first image data corresponds to the second image data.

Clause 52. The system of clause 51, wherein confirming the first image data corresponds to the second image data comprises comparing the first image data to the second image data to determine the first image data matches the second image data.

Clause 53. The system of at least one of clauses 51-52, wherein the first image data corresponds to a first code embedded in the presentation of the advertisement and the second image data corresponds to a second code stored on the server of the online service provider.

Clause 54. The system of clause 53 wherein the first image data corresponds to a first human recognizable portion of the presentation of the advertisement and the second image data corresponds to a second human recognizable portion of the portion of the advertisement stored on the server of the online service provider.

Clause 55. The system of at least one of clauses 51-54, wherein confirming the first image data corresponds to the second image data comprises processing the first image data using a neural network to determine the second image data corresponds to the first image data.

Clause 56. The system of at least one of clauses 51-55, wherein the computer-executable instructions that are executable by the one or more processors further to cause the system to: obtain authorization to share the personal information, the personal information stored by the online service provider, wherein the authorization to share the personal information is provided by a user of the online service provider.

Clause 57. The system of at least one of clauses 51-56, wherein obtaining authorization to share the personal information comprises determining a user of the computing device authorized sharing of the contact information to entities that advertise at least in part through the online service provider, and wherein the personal information comprises at least contact information of the user.

Clause 58. The system of at least one of clauses 51-57, wherein the advertisement is a video advertisement for one or more products and the first image data is based on an image of the video advertisement obtained by a camera of the computing device, and wherein confirming the first image data corresponds to the second image data comprises obtaining the first image data from the computing device and processing the portion of the advertisement stored on the server of the online service provider to generate the second image data.

Clause 59. A non-transitory computer-readable storage medium storing thereon executable instructions that, as a result of being executed by one or more processors of a computer system, cause the computer system to: obtain first image data acquired based on a presentation of an advertisement; confirm the first image data corresponds to second image data, the second image data determined from a portion of the advertisement stored on a server of an online service provider; determine authorization to share user information to an entity associated with the advertisement; and share user information at least in part based on confirming the first image data corresponds to the second image data and the authorization to share user information.

Clause 60. The non-transitory computer-readable storage medium of 59 clause 13, wherein the authorization to share user information is provided by a computing device that acquired the first image data, the authorization to share user information to allow an online service provider to disseminate contact information to the entity associated with the advertisement.

Clause 61. The non-transitory computer-readable storage medium of at least one of clauses 59-60, wherein confirming the first image data corresponds to the second image data comprises comparing the first image data to the second image data to determine that the first image data matches the second image data.

Clause 62. The non-transitory computer-readable storage medium of at least one of clauses 59-61, wherein the first image data corresponds to a first code embedded in the presentation of the advertisement and the second image data corresponds to a second code stored on the server of the online service provider.

Clause 63. The non-transitory computer-readable storage medium of at least one of clauses 59-62, wherein the first image data corresponds to a first human recognizable portion of the presentation of the advertisement and the second image data corresponds to a second human recognizable portion of the portion of the advertisement stored on the server of the online service provider.

Clause 64. The non-transitory computer-readable storage medium of at least one of clauses 59-63, wherein confirming the first image data corresponds to the second image data comprises processing the first image data using a neural network to determine the second image data corresponds to the first image data.

Clause 65. The non-transitory computer-readable storage medium of at least one of clauses 59-64, wherein the executable instructions that, as a result of being executed by the one or more processors of the computer system, further cause the computer system to: identify metadata linked to second image data, the metadata indicating the entity associated with the advertisement.

Clause 66. The non-transitory computer-readable storage medium of at least one of clauses 59-65, wherein the advertisement is a print advertisement for one or more products and the first image data is based on an image of the print advertisement obtained by a camera of the computing device, and wherein confirming that the first image data corresponds to the second image data comprises obtaining the first image data from the computing device and processing the portion of the advertisement stored on the server of the online service provider with a neural network to generate the second image data.

Figure 7:
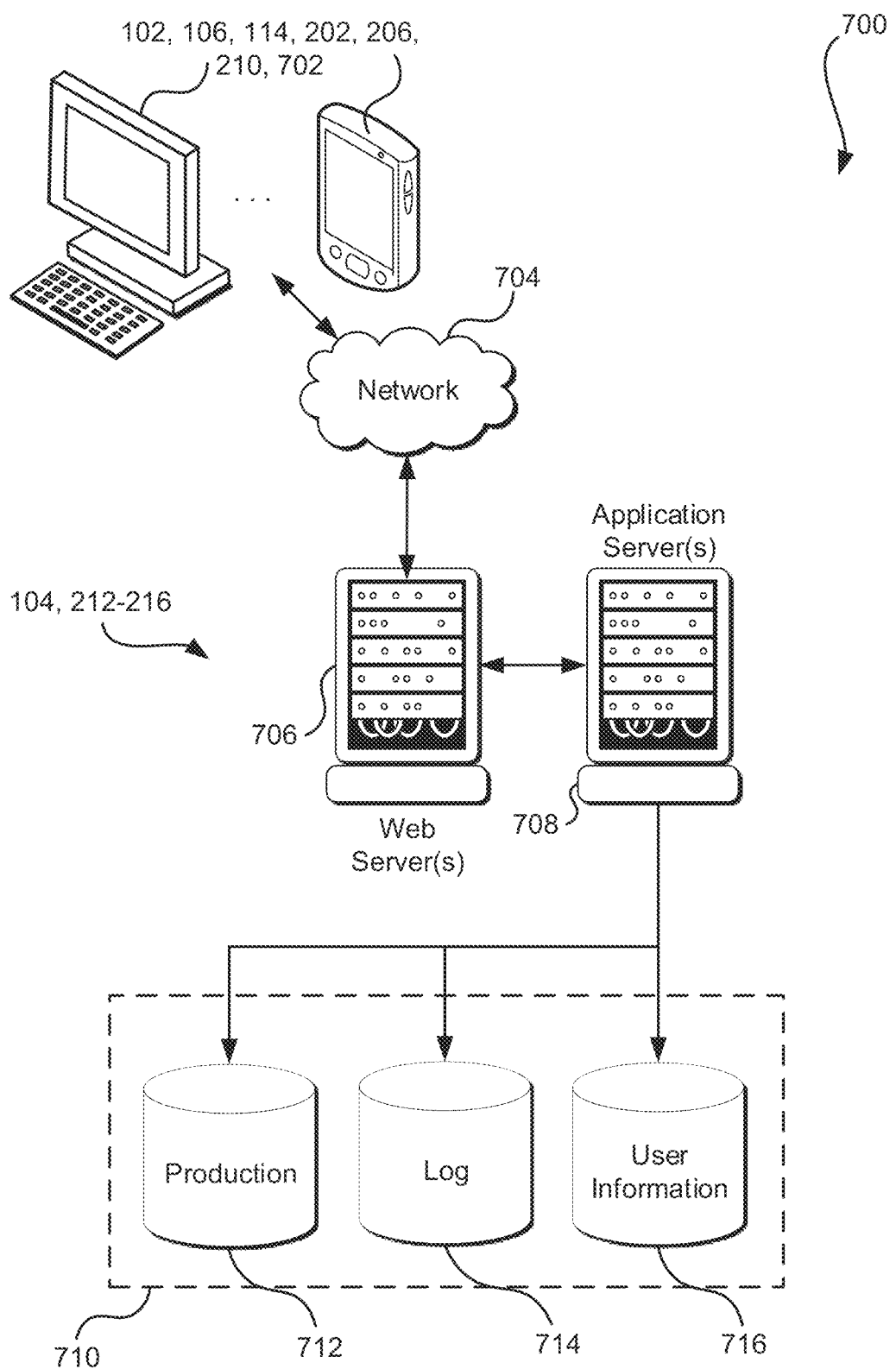
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. The disclosed devices 102, 106, 114, 202, 206 and/or 210 can have the same or similar form factor and functionalities as the device 702. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application. The described devices 102, 104, 106, 114 and/or 212-216 may incorporate some or all of the operational functionalities and characteristics offered by the devices 706-716.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation ("JSON"), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    obtaining, from a first computing device, a code assigned to a second computing device to receive media content, the code obtained from an image displayed by the second computing device;
    based on the code, verifying the second computing device is authorized to receive the media content;
    obtaining access data from the first computing device, the access data generated based on an authentication process to verify an identity of a user of the first computing device;
    based on the access data, confirming the user of the first computing device is authorized to access the media content; and
    streaming the media content to the second computing device in response to verifying the second computing device is authorized to receive the media content and further in response to confirming the user of the first computing device is authorized to access the media content.

2. The computer-implemented method of claim 1, wherein the image is a quick response (QR) code image and the code assigned to the second computing device is obtained by scanning the QR code image using a camera of the first computing device and processing the scanned QR code image to determine the code, and wherein the QR code image is to be displayed in an application of the second computing device to obtain the media content.

3. The computer-implemented method of claim 1, wherein verifying the second computing device is approved to receive the media content comprises:
    searching a computer storage to locate a stored code that matches the code obtained from the first computing device; and
    verifying metadata, associated with the stored code, identifies the second computing device, the metadata further specifying that the second computing device is authorized to obtain the media content.

4. The computer-implemented method of claim 1, wherein the access data comprises an access token provided by the first computing device to confirm the user of the first computing device is authorized to access the media content, the access token obtained by the first computing device based on an authentication process that generated the access token, the authentication process generates the access token executed prior to obtaining the code assigned to the second computing device.

5. A system, comprising:
    one or more processors; and
    memory that stores computer-executable instructions that are executable by the one or more processors to cause the system to:
        obtain an identifier associated with a scannable image displayed by a computer hosted application, the identifier linking the computer hosted application to a service that provides content, the computer hosted application to access the content from the service;
        obtain access data;
        use the access data to confirm a user is authorized to access the service that provides the content; and
        based on the identifier and the access data, allow the computer hosted application to access the content provided by the service.

6. The system of claim 5, wherein the scannable image comprises a non-alphanumeric encoding of the identifier, the identifier obtained based on a process that authorizes the computer hosted application to obtain the content provided by the service.

7. The system of claim 6, wherein the identifier is determined by scanning a non-alphanumeric encoding of the identifier using a camera of a computing device and processing the scanned non-alphanumeric encoding of the identifier to determine the identifier, and obtaining the identifier comprises receiving the identifier from the computing device that scanned the non-alphanumeric encoding of the identifier.

8. The system of claim 5, wherein the access data comprises credential data usable to confirm a user is authorized to access the content, the access data obtained based on a prior authentication process that generated the access data.

9. The system of claim 5, wherein the access data comprises an access token provided to confirm a user is authorized to access the content, the access token obtained based on a prior authentication process that generated the access token, the prior authentication process performed by the service and the access token provided to a first computing device to scan the scannable image or the access token provided to a second computing device to display the computer hosted application.

10. The system of claim 5, wherein the scannable image is a quick response (QR) code and the identifier is obtained by scanning the QR code using a camera of a computing device and processing the scanned QR code to determine the identifier.

11. The system of claim 5, wherein the computer hosted application is an application to receive streamed media content comprising audiovisual media content, and the application displays the scannable image to, at least in part, allow the user to consume the streamed media content via the computer hosted application.

12. The system of claim 5, wherein the computer-executable instructions that are executable by the one or more processors further to cause the system to:
    query a computer storage to locate a stored identifier that matches the identifier associated with the scannable image; and
    verify metadata, associated with the stored identifier, specifies that the computer hosted application is authorized to receive the content.

13. The system of claim 5, wherein the scannable image is displayed by the computer hosted application.

14. The system of claim 5, wherein obtaining the access data is at least based on obtaining the identifier associated with the scannable image.

15. A non-transitory computer-readable storage medium storing thereon executable instructions that, as a result of being executed by one or more processors of a computer system, cause the computer system to:
    obtain identification data, the identification data obtained from processing image data using a first computing device;
    obtain access data associated with the first computing device; and
    based on the identification data and the access data, provide data to a second computing device, the second computing device associated with the image data processed by the first computing device.

16. The non-transitory computer-readable storage medium of claim 15, wherein the image data is obtained from an image displayed on a display device of the second computing device, the image displayed in an application of the second computing device, the application to obtain the data from an online service provider based on at least the identification data.

17. The non-transitory computer-readable storage medium of claim 15, wherein the image data is associated with a quick response (QR) code and the identification data is obtained by scanning the QR code using a mobile phone, the mobile phone to process the image data to determine the identification data, and wherein the identification data at least confirms that the second computing device is authorized to obtain the data.

18. The non-transitory computer-readable storage medium of claim 15, wherein the executable instructions that, as a result of being executed by one or more processors of a computer system, further cause the computer system to:
    search a database storage to locate stored identification data that matches the identification data; and
    verify metadata, associated with the stored identification data, specifies that the second computing device is approved to receive the data.

19. The non-transitory computer-readable storage medium of claim 15, wherein the access data comprises credential data usable to confirm a user is authorized to access the data, the credential data obtained based on a prior authentication process that obtained the credential data.

20. The non-transitory computer-readable storage medium of claim 15, wherein the access data comprises an access token obtained based on a prior authentication process that generated the access token.

21. The non-transitory computer-readable storage medium of claim 15, wherein the data is streamed content comprising streamed audiovisual content, the streamed audiovisual content to be obtained by an application hosted by the second computing device, and wherein the application hosted by the second computing device is to display an image comprising the image data.

22. The non-transitory computer-readable storage medium of claim 21, wherein the image is a non-alphanumeric encoding of the identification data, the identification data determined based on a camera of the first computing device and processing of the non-alphanumeric encoding to be performed by the first computing device or an online service provider.

* * * * *